United States Patent
Chauhan et al.

(10) Patent No.: US 11,775,848 B2
(45) Date of Patent: *Oct. 3, 2023

(54) INTELLIGENT AGENT

(71) Applicant: Bank of America Corporation, Charlotte, NC (US)

(72) Inventors: Sandeep Kumar Chauhan, Hyderabad (IN); Sneha Padiyar, East Mumbai (IN); Nandini Rathaur, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,958

(22) Filed: Jun. 13, 2022

(65) Prior Publication Data

US 2022/0309369 A1    Sep. 29, 2022

Related U.S. Application Data

(63) Continuation of application No. 16/913,530, filed on Jun. 26, 2020, now Pat. No. 11,403,537.

(51) Int. Cl.
*G06F 15/16* (2006.01)
*G06N 5/04* (2023.01)
*G06N 20/00* (2019.01)
*G06F 16/25* (2019.01)

(52) U.S. Cl.
CPC ............. *G06N 5/04* (2013.01); *G06F 16/252* (2019.01); *G06N 20/00* (2019.01)

(58) Field of Classification Search
CPC ......... G06N 5/04; G06N 20/00; G06F 16/252
USPC .......................................................... 709/200
See application file for complete search history.

(56) References Cited

U.S. PATENT DOCUMENTS

| | | | |
|---|---|---|---|
| 9,691,046 B1 | 6/2017 | Adler | |
| 9,767,498 B2 | 9/2017 | Greystoke | |
| 11,204,682 B1 * | 12/2021 | Hall | G07C 5/008 |
| 11,403,537 B2 * | 8/2022 | Chauhan | G06F 16/252 |
| 11,449,710 B2 * | 9/2022 | Foley | G06F 16/289 |
| 11,468,783 B2 * | 10/2022 | Weldemariam | G09B 19/00 |
| 2007/0244835 A1 | 10/2007 | Henry | |
| 2012/0326659 A1 | 12/2012 | Shukuya | |
| 2014/0095269 A1 | 4/2014 | Ham et al. | |

(Continued)

*Primary Examiner* — Moustafa M Meky
(74) *Attorney, Agent, or Firm* — Banner & Witcoff, Ltd.

(57) ABSTRACT

A computing system aggregates information from a plurality of information channels associated with a computing device and a user of the computing device. A user configures the access for the computing system to specific information channels at a user interface. Based on a knowledge base and by machine learning techniques, the computing system analyzes the aggregated information to identify information relevant to an intelligent action for execution on behalf of the user. The computing system identifies the intelligent action in the context of the user's preferences and permissions granted to the computing system. The computing system initiates execution of the intelligent action based on a confidence level derived from analysis of information contained the knowledge base and historical decisioning information. The computing system receives feedback for an executed action and incorporates the feedback in the knowledge base for future decisioning based on aggregated information.

20 Claims, 5 Drawing Sheets

(56) References Cited

U.S. PATENT DOCUMENTS

| | | |
|---|---|---|
| 2016/0044380 A1 | 2/2016 | Barrett |
| 2018/0000575 A1 | 1/2018 | Fobi et al. |
| 2018/0053119 A1* | 2/2018 | Zeng .................... G06F 40/205 |
| 2019/0289058 A1 | 9/2019 | Bhoj et al. |
| 2019/0370036 A1 | 12/2019 | Desai et al. |
| 2020/0250716 A1* | 8/2020 | Laura ................ G06Q 30/0282 |
| 2020/0388186 A1* | 12/2020 | Weldemariam ........ G09B 19/00 |
| 2021/0306201 A1 | 9/2021 | Wang et al. |
| 2021/0326659 A1 | 10/2021 | Zweig et al. |

\* cited by examiner

INTELLIGENT AGENT

CROSS REFERENCE TO RELATED APPLICATIONS

This application is a continuation of and claims priority to patent application Ser. No. 16/913,530 entitled "Intelligent Agent" filed May 26, 2020, which is incorporated by reference in its entirety.

BACKGROUND

Aspects of the disclosure relate to a system for aggregating information associated with an end user from a number of configured channels and providing personalized responses. One or more aspects of the disclosure relate to an intelligent agent system capable of aggregating end user information and initiating, via machine learning, autonomous decision-based responses based on learned end user behavior and preferences.

Today, a number of computing systems associated with a variety of computing devices (e.g., mobile devices, mobile phones, and the like) act as virtual assistants, responding to end user input and providing generic responses to end user input. These systems typically generate generic responses such as, for example, setting a calendar appointment, providing traffic data on route to a destination, and transmitting messages based on received input from an end user. However, these systems lack personalized, autonomous decision-based responses to gathered information that execute on behalf of the end user, as well as lacking the ability to gather information from a number of configurable information input channels associated with the end user.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with aggregating end user information and executing personalized actions associated with a number of systems on behalf of the end user.

In some cases, a computing device (e.g., a mobile cellular device) may include an intelligent agent system, such as an application for the computing device. The intelligent agent system may include a user interface accessible via a display device coupled to the computing device. Using the user interface, a user may configure access rights (e.g., grant, revoke, deny, and the like) to the intelligent agent system to allow access to one or more information channels (e.g., social media platforms, internet browsing data, financial information, location data, user calendar information, and the like) associated with the user. The information channels may include data sourced from hardware components associated with the computing device (e.g., a location tracking device, an ambient light sensor, an accelerometer, user interface devices, pressure sensors, and the like), linked user account information (e.g., social media accounts, bank accounts, email accounts, instant messaging accounts, and the like), and systems and/or applications accessible by the computing device (e.g., mobile applications, calendar applications, calendar information, call information, contact lists, and the like). In some cases, the intelligent agent system may allow a user to input information accessible by the intelligent agent system (e.g., a user may input a personal savings goal via a user interface screen displayed by the user interface). The intelligent agent system may include an aggregation module for centrally aggregating information gathered from the one or more configured information channels. For example, the aggregation module may receive and/or store information aggregated from the information channels using explicit methods (e.g., user provided information for preferences, interests, settings, and the like) and/or implicit methods (e.g., analysis of passive user data from information channels).

In some cases, the intelligent agent system may include a machine learning module to enable intelligent information processing capabilities. For example, the machine learning module may sort and/or analyze the information received and/or fetched by the aggregation module to extract relevant information for autonomous decision-making processes performed by the intelligent agent system. In some cases, the intelligent agent system may include data stores associated with a knowledge base. The knowledge base may include information associated with the granted autonomous decision-making capabilities of the intelligent agent system (e.g., the automatic actions that the intelligent agent system is configured to execute). In some cases, the knowledge base may include information that identifies the systems and/or applications of the computing device that the intelligent agent system may access and/or modify to perform an associated action. For example, the knowledge base may contain permission information corresponding to automated actions to be initiated via one or more mobile device applications.

In some cases, the intelligent agent system may include one or more data stores associated with performance data (e.g., historical decisioning information for previously executed decisions, decision feedback information, and the like) of the intelligent agent system. The one or more data stores may include decision data (e.g., the decision made, the confidence level in the decision, feedback received from the user for the decision, alternative decisions that may have been made) for each executed decision of the intelligent agent system. In some cases, the intelligent agent system may include a decision processing module. The decision processing module may access and/or receive information from the machine learning module, the data stores associated with the knowledge base, and the data stores associated with performance data of the intelligent agent system. The decision processing module may analyze the received information, determine a confidence level for a decision, and/or initiate execution of the decision (e.g., trigger an action to be executed by one or more mobile device applications and/or systems) based on the determined confidence level compared to a confidence threshold. In some cases, the decision processing module may analyze input received at the user interface associated with decision-making processes. The decision processing module may access, modify, and/or otherwise direct the configured applications and/or systems of the computing device to execute one or more processes associated with decisions. After a decision is made and a corresponding action is executed based on direction from the decision processing module, the decision processing module may store log information associated with the decision in the one or more data stores associated with the knowledge base and/or performance information. In some cases, for a decision involving a notification to be displayed at the computing device, the decision processing module may generate and/or trigger an application and/or system of the computing device to generate a notification for display at a display device of the computing device, where the notification may be displayed at the user interface module of the intelligent agent system, a notification system installed as part of an operating system of the computing device, and/or another method to display the notification.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
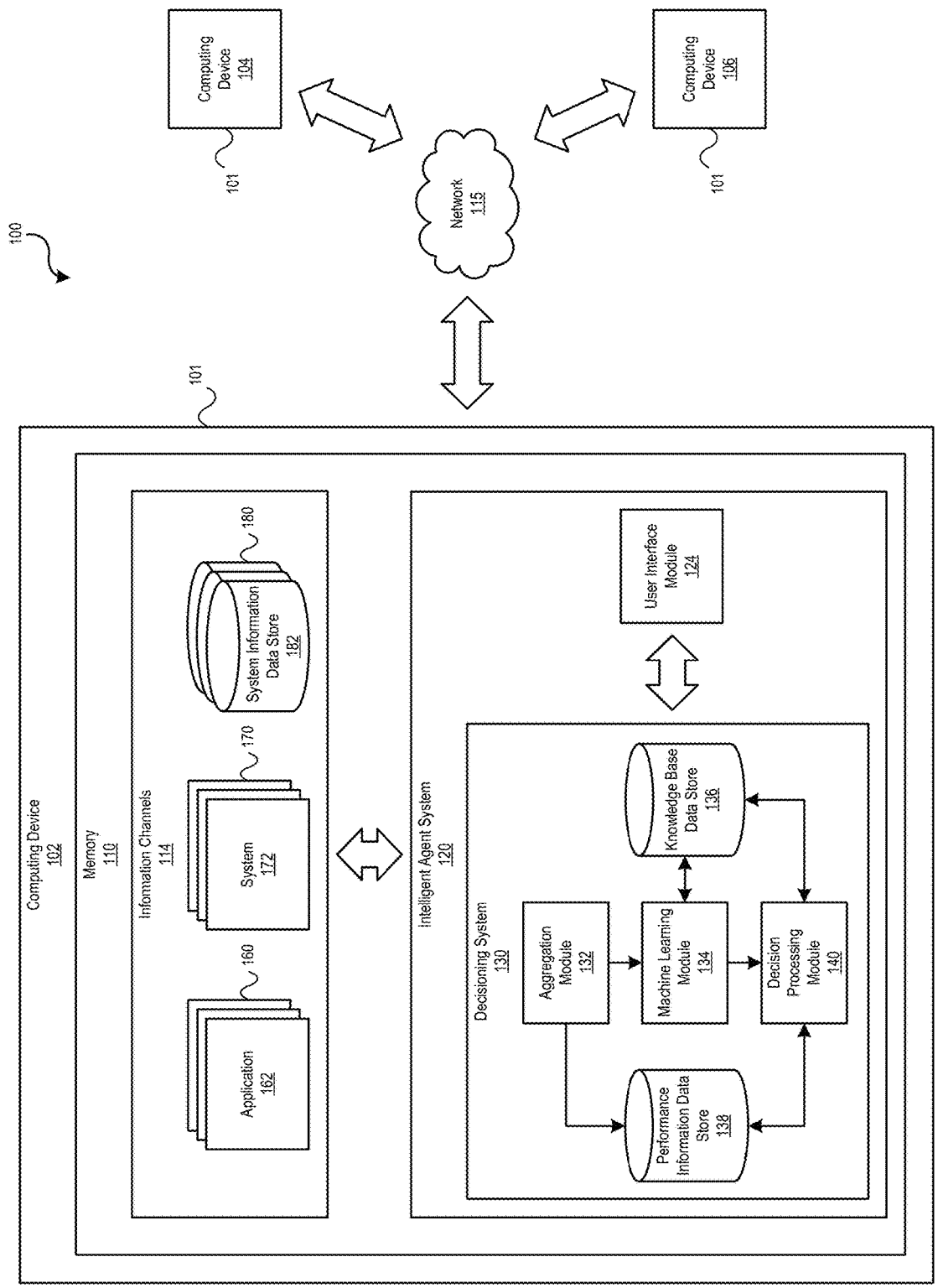
FIG. 1 depicts an illustrative computing environment for the intelligent agent system in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some example arrangements in which the systems described herein may be used. Various other arrangements employing aspects described herein may be used without departing from the invention.

Today, a number of computing devices are equipped with systems and/or applications intended to execute the functionality of a virtual assistant, personal administrator, and the like. Such systems and/or applications typically respond, based on a number of generic functions, to received user input and lack automated, autonomous decision-making capabilities. More systems and/or applications have been limited to single areas of use, including areas such as specialized assistant applications for financial assistance, travel assistance, and time management functionality (e.g., a calendar tool). Additionally, these existing systems and/or applications lack comprehensive user configuration settings to configure automated access to specified user information by the systems and/or applications. As such, a need has been identified for an intelligent agent system capable of aggregating information from a number of information channels associated with a user and/or a computing device (e.g., a mobile cellular device) to perform autonomous decision-making processes on behalf of the user.

In some cases, a computing device, such as a mobile cellular device, may include an intelligent agent system. The intelligent agent system may be installed as an application by storing executable code in one or more memory devices communicatively coupled to the computing device. The intelligent agent system may be configured to access one or more applications and/or systems installed on or associated with the computing device and may autonomously initiate one or more actions associated with the applications and/or systems. In some cases, the intelligent agent system may include a user interface module that may be accessible via a display device coupled to the computing device. A user may input one or more commands at the user interface module and/or a user may input information associated with the user (e.g., user account information, user preferences, and the like) at the user interface module. For example, a user may enter bank account information at the user interface to grant permission for the intelligent agent system to analyze and learn from a user's financial information.

In some cases, at the user interface module, a user may grant the intelligent agent system access to one or more applications, systems, user accounts, and/or other user information associated with the computing device, such as through directly inputting login credentials at the user interface module and granting the intelligent agent system access to an application of the computing device. Additionally, the user interface module may allow the user to grant the intelligent agent system access to the hardware components of the computing device, such as a location tracking device (e.g., a global positioning system (GPS) device), an ambient light sensor, an accelerometer, a touch-sensitive display device, and the like. The user interface module may allow a user to grant and/or revoke access to one or more information channels (e.g., applications, systems, computing device usage information, and the like) associated with the user and/or computing device that interface with the intelligent agent system. In some cases, one or more notifications associated with the decisioning processes of the intelligent agent system may be centrally location at the user interface module for access and/or further action.

In some cases, the intelligent agent system may include an aggregation module. The aggregation module may centrally monitor, aggregate, and/or access information at the one or more configured information channels for the intelligent agent system. The aggregation module may continuously and/or periodically fetch information from the one or more information channels. The aggregation module may access the information channels that may include data sourced from hardware components associated with the computing device (e.g., a location tracking device, an ambient light sensor, an accelerometer, a touch-sensitive display device, and the like), user account information (e.g., social media accounts, bank accounts, email accounts, instant messaging accounts, and the like), and/or systems of the computing device (e.g., an internet browser, applications, contact lists, calendar information, computer device usage information, and the like). In some cases, the aggregation module may access information at a specific information channel based on a user accessing the specific information channel (e.g., the aggregation module may fetch the information associated with the application during the time of user access). Additionally or alternatively, the aggregation module may access and/or fetch information from an information channel as it is received and/or otherwise made available at the computing device (e.g., interrupt based access). For example, if a text message is received at the computing device via a network, the aggregation module may immediately access and analyze the information contained in the text message, rather than waiting for a preconfigured interval and/or time.

In some cases, the intelligent agent system may include a machine learning module. The machine learning module may operate based on semi-supervised support vector machine learning techniques. The machine learning module may enable the intelligent agent system to analyze previous decision-making processes in combination with newly received information (e.g., information channel information, user feedback information) to formulate and/or revise decision-making processes and models. The machine learning module may continuously and/or periodically analyze information analyze the aggregated information from the aggregation module to determine the relevance of the aggregated information to decision-making processes.

In some cases, the intelligent agent system will include one or more data stores associated with a knowledge base for the intelligent agent system. The knowledge base may include information associated with user configuration preferences and/or settings for the intelligent agent system (e.g., information indicating that the intelligent agent system may and/or not access information associated with an instant messaging application of the computing device). In some cases, the information of the knowledge base will be used to generate a user profile for the user associated with the computing device. The user profile may be automatically updated, altered, and/or otherwise changed based on information received from the information channels to maintain an accurate assessment of the user's preferences related to the intelligent agent system. The machine learning module may analyze the relevant information sourced from the aggregation module in context of the configuration settings and/or preferences of the knowledge base. In some cases, the knowledge base may include comprehensive information indicating the systems, applications, and or settings associated with the computing device that the intelligent agent system may potentially access (e.g., the systems for which the intelligent agent may perform automatic decision-making processes on behalf of the user). If the machine learning module analyzes the relevant information and determines the information may result in and/or contribute to a new decisioning process, the machine learning module may add the relevant information to knowledge base.

In some cases, the intelligent agent system may include one or more data stores associated with decisioning performance information (e.g., historical information associated with previous decisioning processes of the intelligent agent system). The one or more data stores may include information associated with previous decisioning processes including the decision made, the result of the decision (e.g., the action initiated for execution by the intelligent agent system), user feedback associated with the decision, the confidence level in the decision, and the like. Such information may be made available for a decisioning processing module to initiate one or more executable actions.

In some cases, the intelligent agent system may include a decision processing module. The decision processing module may access and/or receive information from the machine learning module and the one or more data stores associated with the knowledge base and/or decisioning performance information. The decision processing module may analyze the received information from the machine learning module, knowledge base data stores, and/or performance information data stores to formulate a decision and/or action associated with a system, application, and/or function of the computing device. In some cases, the decision processing module may determine a confidence level for a decision and compare the determined confidence level to configured threshold. If the user configuration information of the knowledge base permits the decision processing module to initiate execution of the decision, the decision processing module may initiate execution of the decision at the associated application and/or system. In some cases, the decision processing module may process input received at the user interface associated with user permission for a specific decision-making process. After a decision is made and a corresponding action is initiated by the decision processing module, the decision processing module may store log information related to the decision in the one or more data stores associated with the knowledge base and/or performance data.

FIG. 1 shows an illustrative computing environment 100 for an intelligent agent system 120 in accordance with one or more aspects described herein. The illustrative computing environment 100 may include one or more networks 115 (e.g., a telecommunications network, the Internet, a Wi-Fi network, and the like). In some cases, the network 115 may be a wired or wireless network, such as the networks described below with respect to FIGS. 3 and 4. The illustrative computing environment 100 may include one or more computing devices 101 (e.g., computing device 102, computing device 104, computing device 106). The one or more computing devices 101 may include one or more characteristics with respect to those of the intelligent agent computing device 301 of FIG. 3. The one or more computing devices 101 may be associated with one or more users. In some cases, a user may be associated with more than one computing device. The one or more computing devices 101 may be one of a mobile device, a tablet, a laptop computer, a desktop computer and/or the like. In some cases, the one or more computing devices 101 may be a mobile cellular device. The one or more computing devices 101 may be communicatively coupled to the one or more networks 115 of the illustrative computing environment 100. The one or more computing devices 101 may include one or more memory 110. The memory 110 may include one or more computer-readable media devices as described herein for FIG. 3. Software (e.g., computer-readable instructions) may be stored within the memory 110 and/or another digital storage of the one or more computing devices 101 to provide instructions to a processor for enabling the one or more computing devices 101 to perform various functions as discussed herein. In some cases, the one or more computing devices 101 may include a display device. The one or more computing devices 101 may receive one or more inputs via one or more input devices (e.g. a touch-sensitive display, a keyboard, a microphone, a camera, and the like). The one or more computing devices 101 (e.g., computing device 104, computing device 106) may include the same contents, characteristics, and/or functionality as described herein for computing device 102.

In some cases, the memory 110 of the computing devices 102 may store executable code corresponding to one or more applications 160. The one or more applications 160 may include, email client platform applications, messaging applications, social media platform applications, internet browser applications, accessibility applications, consumer account-based applications (e.g., financial applications, retail applications), and the like. The one or more applications 160 may correspond to one or more accounts associated with the user of the computing device 102. For example, the application 162 (e.g., a banking application may include a login user interface screen for a user to input account information (e.g., a username and password). The user of the computing device 102 may add and/or remove applications to the computing device 102. Further, one or more of the applications 160 may receive and/or send information via the network 115 (e.g., a telecommunications network).

In some cases, the memory 110 of the computing device 102 may store executable code corresponding to one or more systems 170. The one or more systems 170 may be systems associated with the native functionality of the computing device 102 (e.g., an operating system and the associated sub-systems). For example, the operating system of mobile cellular device (e.g., computing device 102) may include a system 172 to initiate and receive phone calls. Associated systems (e.g., systems 170) for the phone call system may include a voicemail system, a contact list system, and the like. In some cases, systems of the computing device 102 may collect data from one or more hardware devices (e.g., sensors, input/output devices, and the like) of the computing device 102. Hardware devices of the computing device 102 may include ambient light sensors, location tracking devices (e.g., a GPS device), accelerometers, gyroscopes, infrared sensors, microphones, speakers, and the like.

In some cases, the memory 110 of the computing device 102 may include one or more system information data stores 180. The one or more system information data stores 180 may include information gathered from one or more systems 170, hardware devices of the computing device 102, and networks (e.g., network 115) to which the computing device 102 is connected. For example, a system information data store 182 may include usage information for the computing device 102 (e.g., instances the computing device 102 has been physically held by a user, computing device 102 movement information, duration of time the computing device has been operated, and the like), display device information (e.g., brightness, user input speed at the display device), computing device 102 location information (e.g., location data gathered from a GPS device), and information received via the network 115 associated with a second user of the intelligent agent system 120 for the computing device 104. In some cases, the system information data stores 180 may include account information (e.g., username, password, login credentials) associated with a user of the intelligent agent system 120, where the account information may be input by a user at a user interface module 124. The account information stored system information data stores 180 may allow the intelligent agent system 120 to access the information associated with the account information for decisioning processes as described herein.

In some cases, the memory 110 of the computing device 102 may store executable code for operation of an intelligent agent system 120. The intelligent agent system 120 may be installed as an application 162 in the memory 110 of the computing device 102, as a system 172 installed on the computing device, and/or integrated into one or more different components of the computing device 102. The intelligent agent system 120 may be granted access to one or more of the applications 160, systems 170, and/or system information data stores 180 of the computing device 102. The intelligent agent system 120 may be granted access to the one or more hardware devices associated with the computing device 102. In some cases, the intelligent agent system 120 may initiate execution of one or more processes and/or actions at the one or more applications 160 and/or systems 170 of the computing device 102. The intelligent agent system 120 may initiate execution of one or more processes and/or actions autonomously and/or based on received input from a user of the computing device 102. For example, the intelligent agent system 120 may process an algorithm to automatically analyze the user's activities with one or more applications 160 and/or systems 170 of the computing device 102, where the intelligent agent system 120 may send an output to trigger an action (e.g., trigger execution of a function to an increase a user's credit card limit in a financial application based on a declined transaction associated with the user's credit card) within an application 162 (e.g., a financial application installed on the computing device 102) and/or at a remote computing system (e.g., a banking computing system associated with the financial application). Additionally, for example, the intelligent agent system 120 may automatically analyze a user's social media activity and internet browser history and generate a notification for display at a user interface of the computing device (e.g., computing device 102) that contains information recommending the purchase of one or more consumer products. As another example, a user may input accessibility preferences associated with a condition (e.g., blindness) and the intelligent agent system 120 may initiate a read-aloud feature for voice text messages associated with a messaging application (e.g., of the one or more applications 160) out of a speaker coupled to the computing device 102. In some cases, the intelligent agent system may analyze user inputs to the computing device 102 and/or outputs from the computing device concurrently with the actions, periodically, or in response to an action (e.g., an interrupt notification).

In some cases, the intelligent agent system 120 may include a user interface module 124. The user interface module 124 may be accessible at a display device coupled to the computing device 102. The intelligent agent system 120 may receive one or more inputs from the user at the user interface module 124 via one or more input devices as described herein for the computing device 102. In some cases, at the user interface module 124, the user may configure the access settings for the intelligent agent system 120. The user may grant or deny the intelligent agent system 120 access to information associated with specific applications 160, systems 170, and/or system information data stores 180 of the computing device 102. For example, the user may configure the intelligent agent system 120 to analyze and/or access the information associated with an email client application (e.g., application 162), location tracking device (e.g., a GPS device) information, social media account information, and messaging information associated with a messaging application (e.g., application 162). In some cases, a configuration user interface screen provided by the user interface module 124 may include an area for a user to enter one or more login credentials (e.g., usernames, passwords, and the like) for account information associated with the user, where the information accessible via the account login credentials may be made available for access by the intelligent agent system 120. The one or more login credentials for account information may be stored in the one or more system information data stores 180.

In some cases, at the user interface module 124, the user may access a configuration user interface screen to grant or deny the intelligent agent system 120 the ability to autonomously initiate execution of processes and/or actions associated with specific applications 160, systems 170, system information data stores 180, and or other elements of the computing device 102. For example, the user may enter a permission configuration on a configuration user interface screen to grant permission for the intelligent agent system 120 to automatically set a travel notice for the geographic location in a financial application (e.g., application 162) associated with a user's credit card, based on aggregated information that indicates a user is traveling to a certain geographic location. In some cases, the intelligent agent system 120 may include a decisioning system 130 associated with the autonomous decisioning processes of the intelligent agent system 120. The user interface module 124 may access and modify elements of the decisioning system 130 based on the received input at the user interface module 124. In some cases, elements of the decisioning system 130 may generate one or more notifications for display at the user interface module 124 and/or request feedback from a user at the user interface module 124 for specific decision-making processes.

In some cases, the decisioning system 130 may including an aggregation module 132. The aggregation module 132 may receive and/or otherwise aggregate information from the one or more information channels 114 (e.g., applications 160, systems 170, system information data stores 180) of the computing device 102. In some cases, the intelligent agent system 120 may be included with an existing application 162 and be granted access to the information contained therein. For example, the intelligent agent system 120 may be included functionality of an existing financial application (e.g., application 162) and be granted access to user account information (e.g., checking account, savings account, credit card account) associated with the financial application.

In some cases, the aggregation module 132 may monitor specific information channels 114 to receive and/or aggregate information associated with decision-making processes of the intelligent agent system 120. In some cases, the aggregation module 132 will receive and/or aggregate information from an information channel as it is received and/or made available at the computing device 102. For example, an email client application (e.g., application 162) accessible to the intelligent agent system 120 may receive an email message via the network 115 by synchronizing with a remote email client server. The aggregation module 132 may receive the contents of the email message in the intelligent agent system 120 as the email client application (e.g., application 162) receives the email message. Additionally or alternatively, for example, the aggregation module 132 may receive the contents of the email message in the intelligent agent system 120 when the aggregation module 132 periodically fetches information (e.g., every minute, every 10 minutes) from the email client application (e.g., application 162).

In some cases, the aggregation module 132 may fetch information continuously and/or periodically from an information channel. For example, the aggregation module 132 may fetch location information associated with the computing device from a data store (e.g., a system information data store 182) of the computing device 102. If the location data is dated beyond a certain period of time (e.g., an hour), the aggregation module 132 may fetch location information from a system (e.g., system 172) associated with a location tracking device (e.g., a GPS device) of the computing device 102 and/or from an application (e.g., application 162) that tracks the location information of the computing device 102 (e.g., a maps application). In some cases, the aggregation module 132 may fetch information based on received input from a user at the user interface module 124. For example, a user may enter a savings goal at the user interface module 124 and in response, the aggregation module 132 may fetch financial information associated with the user from a financial application (e.g., 162).

In some cases, the aggregation module 132 may receive information associated with one or more users of one or more alternate computing devices (e.g., computing device 104, computing device 106) via the network 115, where the computing devices are equipped with an intelligent agent system 120. A user of a computing device (e.g., computing device 102) may configure the ability to share information aggregated at the aggregation module 132 with other users of the intelligent agent system 120. For example, a first user of the computing device 102 may grant access to specific user information (e.g., location data) for a second user of the computing device 104 at the user interface module 124, where the first user and second user are mutual contacts in a contact list system (e.g., system 172) associated with both the computing device 102 and the computing device 104. In some cases, the aggregation module 132 may receive information associated with the user for one or more alternate computing devices (e.g., computing device 104, computing device 106) that are also operated by the user via the network 115, where the computing devices are equipped with an intelligent agent system 120. A user of two or more computing devices (e.g., computing device 102, computing device 104, computing device 106) may configure the ability to share information aggregated at the aggregation module 132 of each computing device associated with the user among each of the commonly operated computing devices associated with the user. For example, a user may operate a personal mobile cellular device (e.g., computing device 102) and a business mobile cellular device (e.g., computing device 104) and configure the ability to exchange aggregated information from the aggregation module 132 of the personal mobile cellular device and the business mobile cellular device, allowing for aggregation of information from multiple computing devices (e.g., computing device 102, computing device 104) associated with the user.

In some cases, the intelligent agent system 120 may include a machine learning module 134. The machine learning module 134 may receive the aggregated information of the one or more information channels 114 from the aggregation module 132. The machine learning module 134 may continuously and/or periodically receive information from the aggregation module 132. In some cases, the machine learning module 134 may analyze the received information using semi-supervised support vector machine learning techniques. Additionally or alternatively, in some cases, the machine learning module 134 may utilize supervised decisioning algorithms (e.g., regression, decision tree, neural networks, and the like), unsupervised decisioning algorithms (e.g., Apriori algorithms, K-means, and the like), and/or reinforcement decisioning techniques (e.g., Markov decision processes). In some cases, the machine learning module 144 may analyze, based on a supervised decisioning algorithm, an unsupervised decisioning algorithm, a reinforcement decisioning algorithm, and the like, the received information from the aggregation module. The machine learning module 134 may analyze the received information to determine if the received information from the aggregation module 132 may result in executable action as a result of the decision-making process of the decisioning system 130. In some cases, the machine learning module 134 may be trained by one or more sets of training data in order to identify if the received information may result in executable action. The results of the analyzed training data and/or received feedback from the user may be stored in one or more knowledge base data stores 136 and used to continuously train the machine learning module 134.

In some cases, the decisioning system 130 may include one or more knowledge base data stores 136. A knowledge base data store 136 may contain information associated with one or more user configurations, preferences, and/or settings for the intelligent agent system 120. For example, the knowledge base data store(s) 136 may include information received at the user interface module 124 that denies the intelligent agent system 120 permission to access a social media application (e.g., application 162) of the computing device 102. Additionally, for example, the knowledge base data store(s) 136 may include information granting the intelligent agent system 120 the ability to access a messaging system (e.g., system 172) information, however, also denying the intelligent agent system 120 the ability to automatically send a reply message in response to a received message. In some cases, the knowledge base data store(s) 136 may include generic training data information associated with decision-making processes of the intelligent agent system 120 and/or results of training data provided to the machine learning module 134. The generic training data information and/or results of training data provided to the machine learning module 134 may enable the intelligent agent system 120 the ability to initiate execution of actions on behalf of the user, prior to developing a comprehensive user profile in the knowledge base data store(s) 136. For example, the knowledge base data store(s) 136 may be prefilled with information indicating that if a user books airplane tickets to travel to a location, the user may require corresponding lodging and rental car accommodations at the destination location. Additionally, for example, a knowledge base data store 136 may include information indicating that a user has granted permission to the intelligent agent system 120 to automatically calculate income tax information, where the calculation is based on information derived from a financial application (e.g., 162) of the computing device 102.

In some cases, the combination of the information of the one or more knowledge base data stores 136 with information received at the aggregation module 132 may form a user profile associated with the user. The user profile may be updated, modified, and/or otherwise altered based on analysis of information aggregated from the one or more information channels 114 (e.g., applications 160, systems 170, system information data stores 180). In some cases, the machine learning module 134, in combination with the knowledge base data store(s) 136, may approximate the mood associated with the user in the user profile. The knowledge base data store(s) 136 may contain information associating specific information with specific emotions (e.g., happiness, sadness, anger, and the like) in order to generate a mood for the user profile, which may influence decision-making processes associated with the intelligent agent system 120.

In some cases, the machine learning module 134 may generate baseline mood information in the knowledge base data store(s) 136 and determine specific emotions based on analysis of the aggregated information as deviation from the baseline mood information of the user profile. For example, if the machine learning module 134 receives information from a social media application (e.g., application 162) indicating it is the user's birthday, the machine learning module 134 may associate happiness with the user's birthday and add the corresponding information to the user profile for decision-making processes. Additionally, for example, the machine learning module 134 may associate anger with received information from a messaging application (e.g., application 162) in combination with a user's input (e.g., typing speed, typing pressure, gesture acceleration information) at a touch sensitive display device of the computing device 102. Based on the mood information of the user profile in the knowledge base data store(s) 136, the intelligent agent system 120 may initiate execution of one or more targeted actions associated with specific mood information.

In some cases, the intelligent agent system 120 may include one or more performance information data stores 138. The one or more performance information data stores 138 may be accessible and/or provide information to the aggregation module 132 and/or a decision processing module 140. The performance information data store(s) 138 may include historical information associated with the decisioning system 130 and/or intelligent agent system 120. In some cases, the performance information data store(s) 138 may include historical information for each decision made by a decision processing module 140 of the decisioning system 130. The historical information may include information associated with previous decision-making processes of the intelligent agent system 120 including the decision made, the action executed as a result of the decision, user intervention associated with the decision (e.g., a user allowed and/or denied the decision at the user interface module 124), the determined confidence level for the decision, and/or user feedback associated with the decision. The confidence level for a decision may be a numerical score and/or percentage calculated based on the confidence of the intelligent agent system 120 in executing a specific decision. In some cases, the confidence level associated with a decision may change in response to received user feedback at the user interface module 124 and be used by the machine learning module to improve operation of the intelligent agent system 120.

As an example, the intelligent agent system 120 make execute a decision to generate a restaurant recommendation at the user interface module 124 based on aggregated information. The historical information stored in the performance information data store(s) 138 may include the decision to generate the recommendation of a particular restaurant to the user, received feedback at the user interface module 124 that the user accepted the recommendation, location information that the user traveled to the recommended restaurant accessed from the mobile device location sensing device, received feedback at the user interface module 124 that the user enjoyed their experience (e.g., a user interface screen provided to the user when the intelligent agent system 120 sensed that the user left the location of the recommended restaurant, and an initial calculated confidence level of 78 percent, may result in a re-calculated confidence level of 84 percent after receiving feedback.

In some cases the intelligent agent system 120 may include a decision processing module 140. The decision processing module 140 may access, receive, and/or store information data stores associated with the machine learning module 134, one or more knowledge base data stores 136, and/or one or more performance information data stores 138. The decision processing module 140 may aggregate the information from one or more of the machine learning module 134, knowledge base data store 136, and performance information data store 138 to analyze the aggregated information, determine if the aggregated information may result in an executable action, initiate execution of the executable action, and document the result of an executed action. The decision processing module 140 may directly execute and/or trigger one or more applications 160 and/or systems 170 of the computing device 102 to execute one or more actions associated with the one or more applications 160, systems 170, and/or one or more system information data stores 180. In some cases, the decision processing module 140 may trigger the computing device 102 to execute one or more actions at the one or more applications 160 and/or systems 170 based on a determined confidence level for a potential decision.

In some cases, based on the aggregated information from the machine learning module 134, the knowledge base data store(s) 136, and the performance information data store(s) 138, the decision processing module 140 may calculate a confidence level for the potential decision. The confidence level may be numeric and/or be based on a weighted combination of the information available to the decision processing module 140 from the machine learning module 134, knowledge base data store(s) 136, and performance information data store(s) 138. For example, in determining a confidence level in a potential decision, the decision processing module 140 may more heavily weigh information from the knowledge base data store(s) 136, and less heavily weigh information from the performance information data store(s) 138. The decision processing module 140 may compare the confidence level for a potential decision to a decisioning threshold. The decisioning threshold may be a numerical value (e.g., a percentage, a numerical value between 0-1, and the like). In some cases, the decisioning threshold may be a fixed value and/or floating value of the decision processing module 140. In some cases, the decisioning threshold may be assigned at the user interface module 124 by a user of the computing device 102. For example, a user may configure the intelligent agent system 120 to execute decisions with a high confidence value (e.g., a 90 percent confidence value, a 0.9 confidence factor) by directly configuring the decision threshold to a value corresponding to a high confidence value at the user interface module 124.

In some cases, after a decision to execute an action (e.g., trigger one or more applications 160 and/or systems 170 perform an action) is made by the decision processing module 140, the decision processing module 140 may store information associated with the decision in the knowledge base data store(s) 136 and/or the performance information data store(s) 138 as described herein. For example, the decision processing module 140 may store the confidence level associated with the decision in the performance information data store(s) 138. In some cases, the executed action may include notification to the user. For example, an executed decision to recommend traffic information to a user may result in a generated notification to be displayed to the user. A notification may be generated and/or triggered to be generated (e.g., at a notification system 172 of the computing device 102) by the decision processing module 140. For example, for an executed decision that results in offering an automobile loan to a user, the decision processing module 140 may communicate to a financial application (e.g., application 162) to generate and display a notification at the user interface of the financial application that includes an automobile loan offer for the user. In some cases, the notification may be displayed at the user interface module 124 of the intelligent agent system 120, displayed at a user interface of a notification system (e.g., system 172) native to an operating system of the computing device 102, communicated as a message (e.g., an email message, a text message, and the like) to an application 162 and/or system 172 of the computing device 102, and/or otherwise made available at the computing device 102 by another method.

Figure 2A:
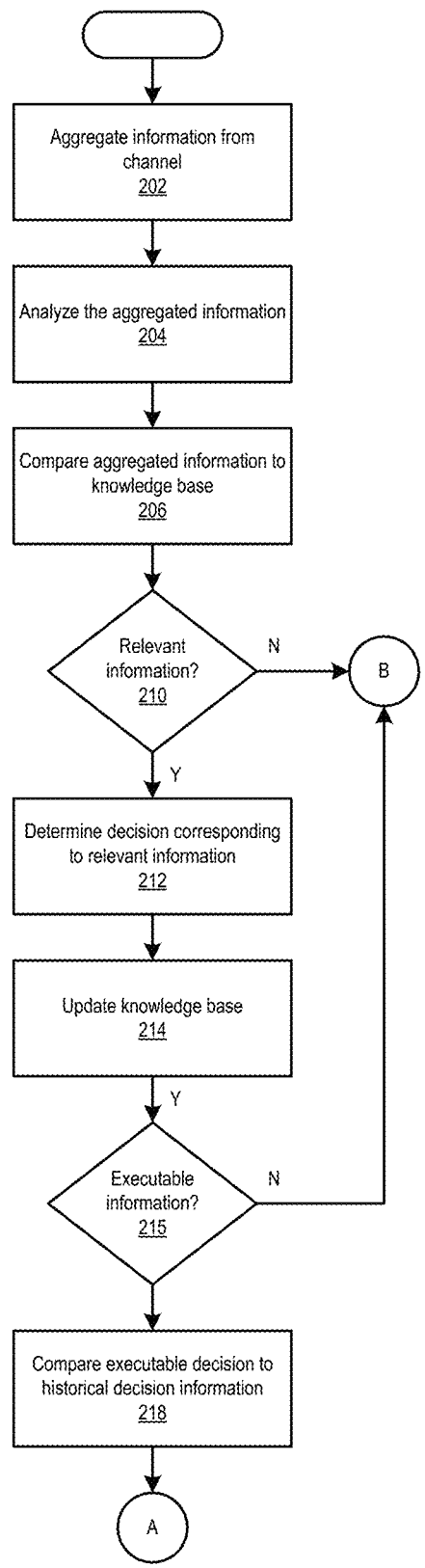
FIG. 2A shows an illustrative event sequence for decision processing of aggregated information in the intelligent agent system in accordance with one or more aspects described herein.

FIG. 2A shows an illustrative event sequence 200 for decision processing of aggregated information in the intelligent agent system 120 in accordance with one or more aspects described herein. The events shown in the illustrative event sequence 200 are illustrative and additional events may be added, or events, may be omitted, without departing from the scope of the disclosure. At 202, the aggregation module 132 may aggregate information for the information channel(s) (e.g., applications 160, systems 170, system information data stores 180) of the computing device 102. The aggregation module 132 may fetch and/or receive information from the information channel(s) at 202 as described herein. At 204, the machine learning module 134 may analyze the aggregated information from the aggregation module 132. The machine learning module 134 may analyze the aggregated information to determine whether the information may result in an executable action associated with the computing device 102. At 206, the machine learning module 134 may compare the analyzed information to the one or more knowledge base data stores 136 to determine if the analyzed information is relevant an executable action at the information channels 114 of the computing device 102 (e.g., applications 160, systems 170, system information data stores 180). For example, aggregated information from a social media post by the user may indicate that the user is interested in a musician. Accordingly, that information may be determined by the machine learning module 134 to be relevant in the context of the contents of the knowledge base data store(s) 136, as it may be used by the intelligent agent system 120 to recommend, via a user interface module 124 of the intelligent agent system 120, message via a notification system (e.g., system 172) of the computing device 102, or other method, concert tickets associated with the musician to the user.

At 210, based on the comparison of the analyzed information to the knowledge base data store(s) 136 by the machine learning module 134, the machine learning module 134 may determine if the analyzed information is relevant. If the analyzed information is determined to not be relevant at 210, the illustrative event sequence 200 for decision processing may end. If the analyzed information is determined to be relevant information at 210, the machine learning module 134 and/or the decision processing module 140 may determine the decision that corresponds to the relevant information at 212. For example, based on user preferences in the knowledge base data store(s) 136, the machine learning module 134 may determine that internet browsing data for automobile loans may be used to recommend personalized automobile loans based on a user's credit score in a financial application (e.g., 160) associated with the intelligent agent system 120. In some cases, more than one possible decision associated with the relevant information may exist at 212. After determining the decision associated with the relevant information at 212, the machine learning module 134 may store the relevant information in the knowledge base data store(s) 136 at 214 to update the user profile associated with the user.

After updating the knowledge base data store(s) 136 at 214, the machine learning module 134 and/or the decision processing module 140 may determine if the relevant information may correspond to an executable action for one or more of the elements (e.g., applications 160, systems 170, system information data stores 180, hardware components) of the computing device 102 at 215. If the relevant information is determined to correspond an executable action at 215, the illustrative event sequence 200 for decision processing may end. For example, analysis of a text message from a messaging application (e.g., 160) by the machine learning module 134 may allow the machine learning module to determine a mood (e.g., happy, sad, angry, and the like) of the user. The determination may be added to the user profile in the knowledge base data store(s) 136 to influence future decision-making processes, but may not directly result in a corresponding executable action. If the relevant information is determined to correspond to an executable action at 215, the decision processing module 140 may compare the executable action to historical decisioning information (e.g., previous associated decisions, confidence factors, and the like) stored in the performance information data store(s) 138 at 218.

Figure 2B:
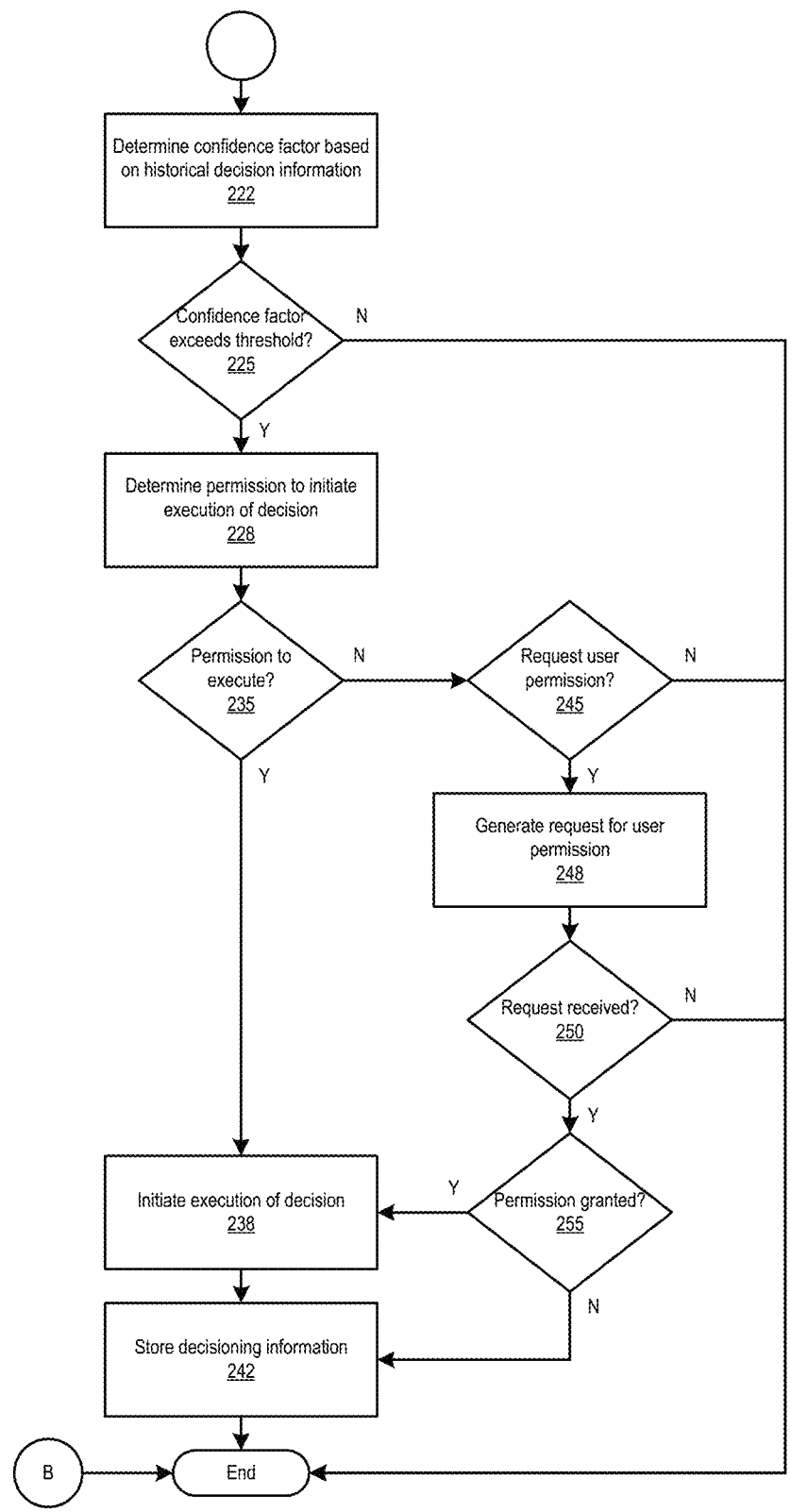
FIG. 2B shows an illustrative event sequence for decision processing of aggregated information in the intelligent agent system in accordance with one or more aspects described herein.

FIG. 2B shows an illustrative event sequence 200 for decision processing of aggregated information in the intelligent agent system 120 in accordance with one or more aspects described herein. The events shown in the illustrative event sequence 200 are illustrative and additional events may be added, or events, may be omitted, without departing from the scope of the disclosure. Continuing from FIG. 2B, based on the comparison of the executable action to historical decisioning information at 218 and/or the information of the knowledge base data store(s) 136, the decision processing module 140 may determine the confidence factor for the decision as described herein at 222. At 225, the determined confidence factor may be compared to the defined confidence threshold associated with initiating execution of the action. If the determined confidence factor fails to exceed the confidence threshold at 225, the illustrative event sequence 200 for decision processing may end. If the determined confidence factor exceeds the confidence threshold at 225, the decision processing module 140 may access the knowledge base data store(s) 136 to determine the granted and/or denied permissions associated with the decision at 228. For example, the knowledge base data store(s) 136 may contain information granting the intelligent agent system 120 the ability to display stock market information at the user interface module 124 based on information aggregated from a financial market application (e.g., 160). If the decision processing module 140 determines there exists permission to initiate execution of the action in the knowledge base data store(s) 136 at 235, the decision processing module 140 may initiate execution of the action at 238. After initiating execution of the action at 238, the decision processing module 140 may store information associated with the executed action and information associated with the decision to initiate execution of the action in the knowledge base data store(s) 136 and/or the performance information data store(s) 138 at 242.

If the decision processing module 140 determines permission does not exist in the knowledge base data store(s) 136 to initiate execution of the action, the decision processing module 140 may determine if the intelligent agent system 120 is configured to request permission at the user interface module 124 to initiate execution of the action at 245. In some cases, the intelligent agent system 120 may be configured to request permission to initiate execution of specific actions. For example, at the user interface module 124, a user may configure the intelligent agent system 120 to request permission for an executable action for which the user has not explicitly denied permission. Additionally or alternatively, the intelligent agent system 120 may be configured not to request permission to initiate execution of specific actions. If the intelligent agent system 120 and/or the knowledge base data stores 136 contain information denying the ability to request user permission at 245, the illustrative event sequence 200 for decision processing may end. If the intelligent agent system 120 and/or the knowledge base data stores 136 contain information granting the ability request user permission at 245, the decision processing module 140 may generate a notification for display at the user interface module 124 and/or at the operating system of the computing device 102 at 248, where the notification includes a request for user permission to initiate execution of the action.

At 250, the decision processing module 140 may determine if a response to the request for user permission has been received at the user interface module 124. If a response to the request for user permission has not been received at 250, the illustrative event sequence 200 for decision processing may end. The decision processing module 140 may allow a duration of time (e.g., 30 seconds, 1 minute, 5 minutes, and the like) for a user to input a response to the request for user permission at 250. After the duration of time expires, absent a received response at the user interface module 124, the decision processing module 140 may interpret the lack of a response as denying permission to initiate execution of the action. If a response to the request for user permission is received at 250, the decision processing module 140 may determine if the received permission response contains information granting the intelligent agent system 120 the ability to initiate execution of the action at 255. If the received permission response contains information denying the decision processing module 140 the ability to initiate execution of the action, the decision processing module 140 may store information associated with the denied action in the knowledge base data store(s) 136 and/or the performance information data store(s) 138 at 242. If the received permission response contains information granting the decision processing module 140 the ability to initiate execution of the action, the decision processing module 140 may initiate execution of the action at 238. After initiating execution of the action at 238, the decision processing module 140 may store information associated with the executed action as described herein at 242 and the illustrative event sequence 200 for decision processing may end. It is to be noted that multiple instances of the illustrative event sequence 200 may occur concurrently and/or successively and that the illustrative event sequence 200 may be a continuous process based on the flow of information from the one or more information channels 114 to the aggregation module 132.

Figure 3:
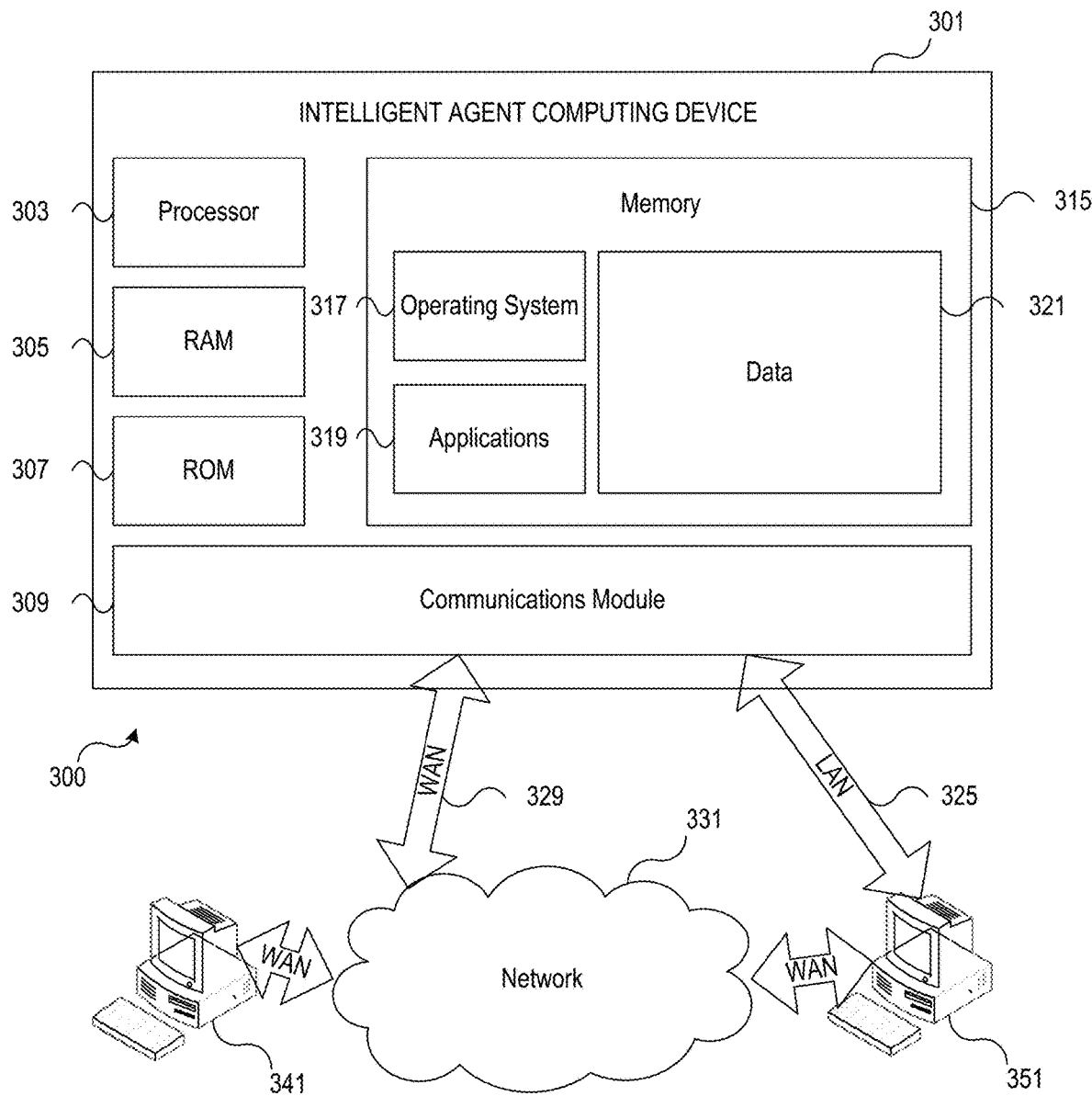
FIG. 3 shows an illustrative operating environment in which various aspects of the disclosure may be implemented in accordance with one or more aspects described herein.

FIG. 3 shows an illustrative operating environment in which various aspects of the present disclosure may be implemented in accordance with one or more example embodiments. Referring to FIG. 3, a computing system environment 300 may be used according to one or more illustrative embodiments. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The computing system environment 300 may include an illustrative intelligent agent computing device 301 having a processor 303 for controlling overall operation of the intelligent agent computing device 301 and its associated components, including a Random Access Memory (RAM) 305, a Read-Only Memory (ROM) 307, a communications module 309, and a memory 315. The intelligent agent computing device 301 may include a variety of computer readable media. Computer readable media may be any available media that may be accessed by the intelligent agent computing device 301, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the intelligent agent computing device 301.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 303 of the intelligent agent computing device 301. Such a processor may execute computer-executable instructions stored on a computer-readable medium.

Software may be stored within the memory 315 and/or other digital storage to provide instructions to the processor 303 for enabling the intelligent agent computing device 301 to perform various functions as discussed herein. For example, the memory 315 may store software used by the intelligent agent computing device 301, such as an operating system 317, one or more application programs 319, and/or an associated database 321. In addition, some or all of the computer executable instructions for the intelligent agent computing device 301 may be embodied in hardware or firmware. Although not shown, the RAM 305 may include one or more applications representing the application data stored in the RAM 305 while the intelligent agent computing device 301 is on and corresponding software applications (e.g., software tasks) are running on the intelligent agent computing device 301.

The communications module 309 may include a microphone, a keypad, a touch screen, and/or a stylus through which a user of the intelligent agent computing device 301 may provide input, and may include one or more of a speaker for providing audio output and a video display device for providing textual, audiovisual and/or graphical output. The computing system environment 300 may also include optical scanners (not shown).

The intelligent agent computing device 301 may operate in a networked environment supporting connections to one or more remote computing devices, such as the computing devices 341 and 351. The computing devices 341 and 351 may be personal computing devices or servers that include any or all of the elements described above relative to the intelligent agent computing device 301.

The network connections depicted in FIG. 3 may include a Local Area Network (LAN) 325 and/or a Wide Area Network (WAN) 329, as well as other networks. When used in a LAN networking environment, the intelligent agent computing device 301 may be connected to the LAN 325 through a network interface or adapter in the communications module 309. When used in a WAN networking environment, the intelligent agent computing device 301 may include a modem in the communications module 309 or other means for establishing communications over the WAN 329, such as a network 331 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 4:
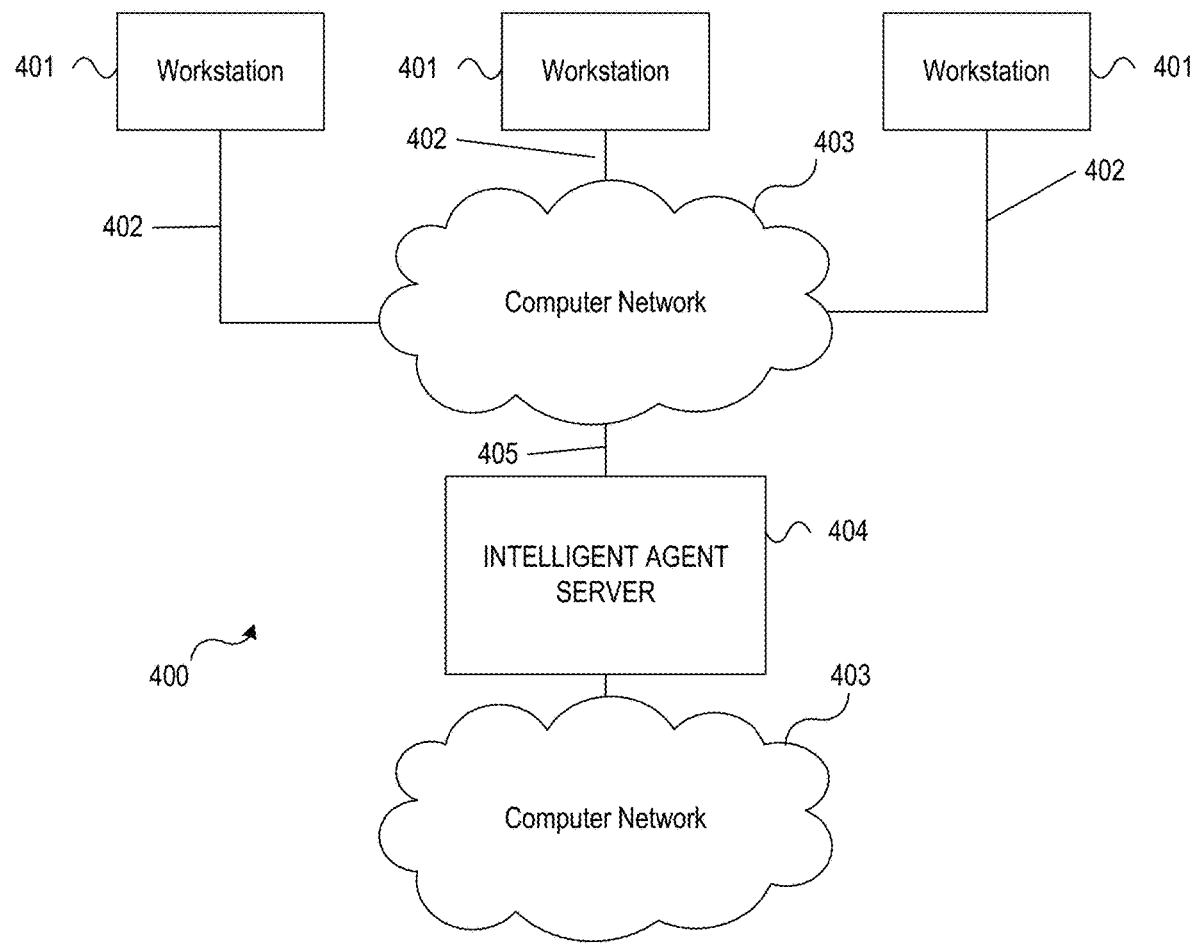
FIG. 4 shows an illustrative block diagram of workstations and servers that may be used to implement the processes and functions of certain aspects of the present disclosure in accordance with one or more aspects described herein.

FIG. 4 shows an illustrative block diagram of workstations and servers that may be used to implement the processes and functions of certain aspects of the present disclosure in accordance with one or more example embodiments. For example, an illustrative system 400 may be used for implementing illustrative embodiments according to the present disclosure. As illustrated, the system 400 may include one or more workstation computers 401. The workstation 401 may be, for example, a desktop computer, a smartphone, a wireless device, a tablet computer, a laptop computer, and the like, configured to perform various processes described herein. The workstations 401 may be local or remote, and may be connected by one of the communications links 402 to a computer network 403 that is linked via the communications link 405 to the intelligent agent server 404. In the system 400, the intelligent agent server 404 may be a server, processor, computer, or data processing device, or combination of the same, configured to perform the functions and/or processes described herein. The intelligent agent server 404 may be used to receive check images and associated data and/or validation scores, retrieve user profile, evaluate the check image compared to the user profile, identify matching or non-matching elements, generate user interfaces, and the like.

The computer network 403 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 402 and 405 may be communications links suitable for communicating between the workstations 401 and the intelligent agent server 404, such as network links, dial-up links, wireless links, hardwired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

The invention claimed is:

1. A system, comprising:
a computing device comprising a data store storing historical decisioning information;
a computing platform comprising:
at least one processor;
a communication interface communicatively coupled via a network to the computing device; and
memory storing computer-readable instructions that, when executed by the at least one processor, cause the computing platform to:
identify, automatically by a machine learning module and based on aggregated information received from a plurality of information channels, relevant information for automatic decisioning;
identify, by the machine learning module and based on a knowledge base and the relevant information, an executable action to be performed by an application associated with the computing platform;
generate, based on the historical decisioning information, a confidence level associated with initiating the executable action by the application, wherein the confidence level corresponds to a user satisfaction with performance of the executable action by the application;
cause execution, by a decision processing module and based on the confidence level, a decision threshold, and user permission information, of the executable action at a system of the computing platform associated with the executable action; and
update, via the network, the historical decisioning information with decisioning information associated with the executable action initiated at the system of the computing platform, wherein the decisioning information comprises a description of the executable action, the confidence level, the decision threshold, and user feedback associated with the executable action.

2. The system of claim 1, wherein the instructions further cause the computing platform to:
compare, by the decision processing module, the confidence level to the decision threshold associated with the executable action, wherein the decision threshold is determined based on analysis of the knowledge base, the historical decisioning information, and the user feedback.

3. The system of claim 1, wherein the instructions further cause the computing platform to:
identify, based on the executable action and at the knowledge base, the user permission information associated with the executable action.

4. The system of claim 1, wherein the instructions further cause the computing platform to:
cause display, by the decision processing module and at a user interface of the computing platform, a request for user permission information associated with the executable action.

5. The system of claim 4, wherein the instructions further cause the computing platform to:

receive, by a user interface of the computing platform, a permission response, wherein the permission response comprises information indicating approval or disapproval of the executable action; and
cause storage, at the knowledge base, of the permission response.

6. The system of claim 1, wherein the instructions further cause the computing platform to:
configure accessibility settings for an aggregation module to deny or allow the aggregation module to access an information channel of the plurality of information channels.

7. The system of claim 1, wherein the instructions further cause the computing platform to:
receive, by a user interface of the computing platform, the user feedback comprising information indicating a user satisfaction level with the executable action; and
cause storage, at the knowledge base and with the historical decisioning information, the user feedback.

8. The system of claim 1, wherein the plurality of information channels comprises account information, applications, systems associated with the computing platform, and data gathered from peripherals of the computing platform.

9. A method, comprising:
at a computing platform comprising one or more processors, memory, and a communication interface:
identifying, automatically by a machine learning module and based on aggregated information received from a plurality of information channels and based on a knowledge base, relevant information for automatic decisioning;
identifying, by the machine learning module and based on the knowledge base and the relevant information, an executable action to be performed by an application associated with the computing platform;
generating, based on the knowledge base and historical decisioning information, a confidence level associated with initiating the executable action by the application, wherein the confidence level corresponds to a user satisfaction with performance of the executable action by the application;
causing execution, by a decision processing module and based on the confidence level, a decision threshold, and user permission information, of the executable action at a system of the computing platform; and
updating the historical decisioning information with decisioning information associated with the executable action, wherein the decisioning information comprises a description of the executable action, the confidence level, the decision threshold, and user feedback associated with the executable action.

10. The method of claim 9, comprising:
determining, based on analysis of the knowledge base, the historical decisioning information, and the user feedback, the decision threshold; and
comparing, by the decision processing module, the confidence level to the decision threshold.

11. The method of claim 9, comprising:
identifying, based on the executable action and the knowledge base, the user permission information associated with the executable action.

12. The method of claim 9, comprising:
generating, by the decision processing module, a notification comprising a request for user permission information associated with the executable action.

13. The method of claim 9, comprising:
receiving, by a user interface of the computing platform, the user feedback comprising information indicating a user satisfaction level with the executable action; and
storing, at the knowledge base and with the historical decisioning information, the user feedback.

14. The method of claim 9, comprising:
configuring accessibility settings to an information channel of the plurality of information channels for an aggregation module.

15. One or more non-transitory computer-readable media storing instructions that, when executed by a computing platform comprising one or more processors, memory, and a communication interface, cause the computing platform to:
identify, automatically by a machine learning module and based on aggregated information received from a plurality of information channels, relevant information for automatic decisioning;
identify, by the machine learning module and based on a knowledge base and the relevant information, an executable action to be performed by an application associated with the computing platform;
generate, based on historical decisioning information, a confidence level associated with initiating the executable action by the application, wherein the confidence level corresponds to a user satisfaction with performance of the executable action by the application;
cause execution, by a decision processing module and based on the confidence level, a decision threshold, and user permission information, of the executable action at a system of the computing platform associated with the executable action; and
update, via a network, the historical decisioning information with decisioning information associated with the executable action initiated at the system of the computing platform, wherein the decisioning information comprises a description of the executable action, the confidence level, the decision threshold, and user feedback associated with the executable action.

16. The one or more non-transitory computer-readable media of claim 15, wherein the instructions, when executed by the one or more processors, cause the computing platform to:
determine, based on analysis of the knowledge base, the historical decisioning information, and the user feedback, the decision threshold; and
compare, by the decision processing module, the confidence level to the decision threshold.

17. The one or more non-transitory computer-readable media of claim 15, wherein the instructions, when executed by the one or more processors, cause the computing platform to:
identify, based on the executable action and the knowledge base, the user permission information.

18. The one or more non-transitory computer-readable media of claim 15, wherein the instructions, when executed by the one or more processors, cause the computing platform to:
generate a notification comprising a request for user permission information associated with the executable action;
receive, at a user interface of the computing platform, a permission response comprising information indicating approval or disapproval of the executable action; and
store, at the knowledge base, the permission response.

19. The one or more non-transitory computer-readable media of claim 15, wherein the instructions, when executed by the one or more processors, cause the computing platform to:
- configure accessibility settings to an information channel of the plurality of information channels for an aggregation module.

20. The one or more non-transitory computer-readable media of claim 15, wherein the instructions, when executed by the one or more processors, cause the computing platform to:
- receive, by a user interface of the computing platform, the user feedback associated with the executable action, wherein the user feedback comprises information indicating a user satisfaction level with the executable action; and
- store, at the knowledge base and with the historical decisioning information, the user feedback associated with the executable action.

* * * * *